United States Patent [19]

Martensen et al.

[11] 3,950,923

[45] Apr. 20, 1976

[54] ROTARY MOWER

[75] Inventors: Uwe Martensen, Soisy-sur-Seine; Jacques Eugenes Bouet, Villeneuve d'Asco; Arthur Louis Cottenier, Roubiax, all of France

[73] Assignee: International Harvester Company, Chicago, Ill.

[22] Filed: Sept. 11, 1975

[21] Appl. No.: 612,507

Related U.S. Application Data

[63] Continuation of Ser. No. 460,666, April 12, 1974.

[30] Foreign Application Priority Data

May 11, 1973 France .............................. 73.17127

[52] U.S. Cl. ......................................... 56/6; 56/295
[51] Int. Cl.² .......................................... A01D 75/30
[58] Field of Search .................. 56/6, 7, 192, 295

[56] References Cited
UNITED STATES PATENTS

| | | | |
|---|---|---|---|
| 3,483,685 | 12/1969 | Guillotin | 56/6 |
| 3,507,102 | 4/1970 | Kline et al. | 56/295 |
| 3,604,189 | 9/1971 | Harer | 56/295 |

*Primary Examiner*—Louis G. Mancene
*Assistant Examiner*—Robert F. Cutting
*Attorney, Agent, or Firm*—Raymond E. Parks; Floyd B. Harman

[57] ABSTRACT

A rotary mower of the type having a plurality of side-by-side cutter discs carried on an elongated beam whereby at least the outermost cutter disc of two cutter discs, which are located on the grassward or outboard end of the beam, is provided with paddle means for conveying cut crop inwardly from the standing crop on the grassward side of the mower and depositing the cut crop rearwardly of the direction of travel of the mower. Also at least the outermost disc of the two outboard cutter discs is provided with depending skirt means for sweeping cut crop out from between the underside of the cutter disc and the beam; and the outboard end of the beam is provided with a shoe means for riding the beam over ground obstructions.

20 Claims, 12 Drawing Figures

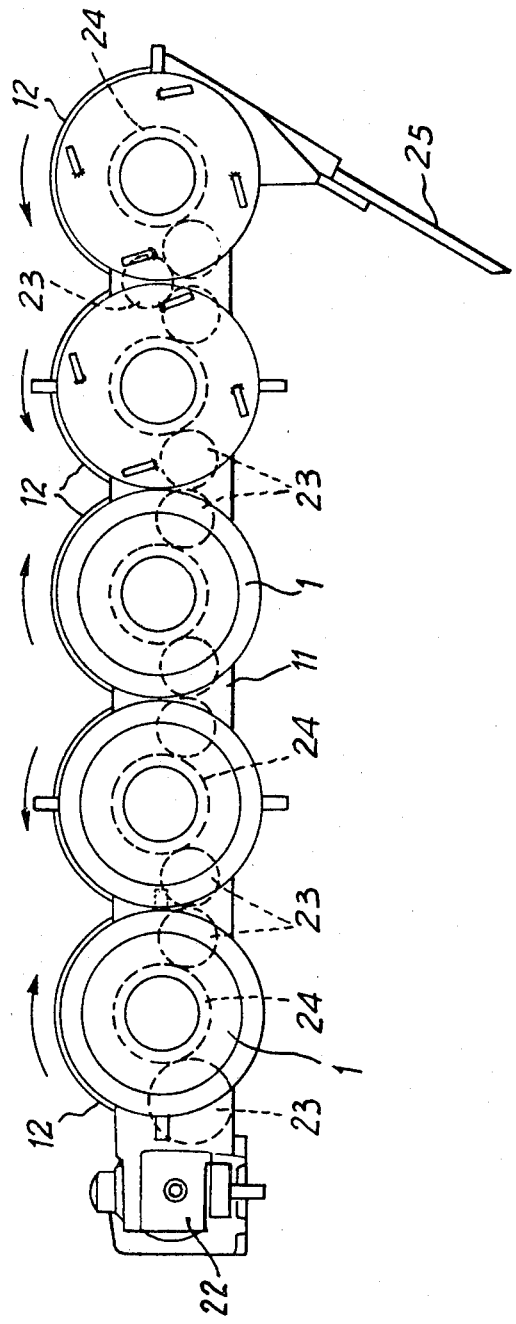
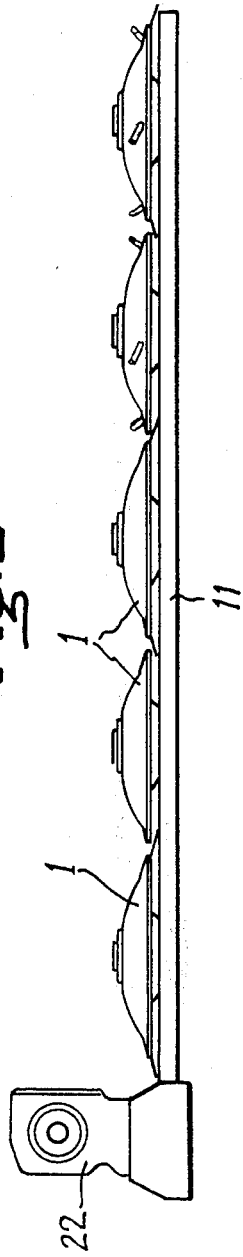

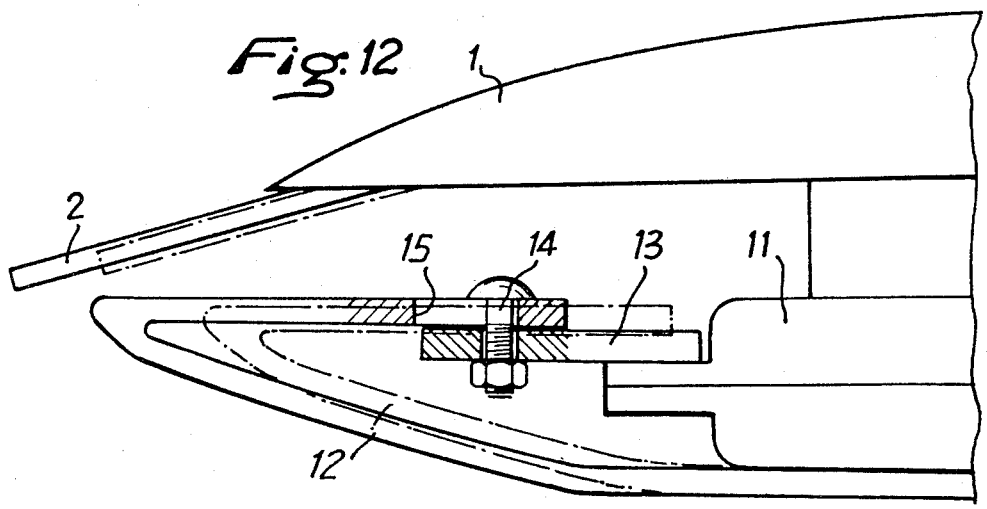
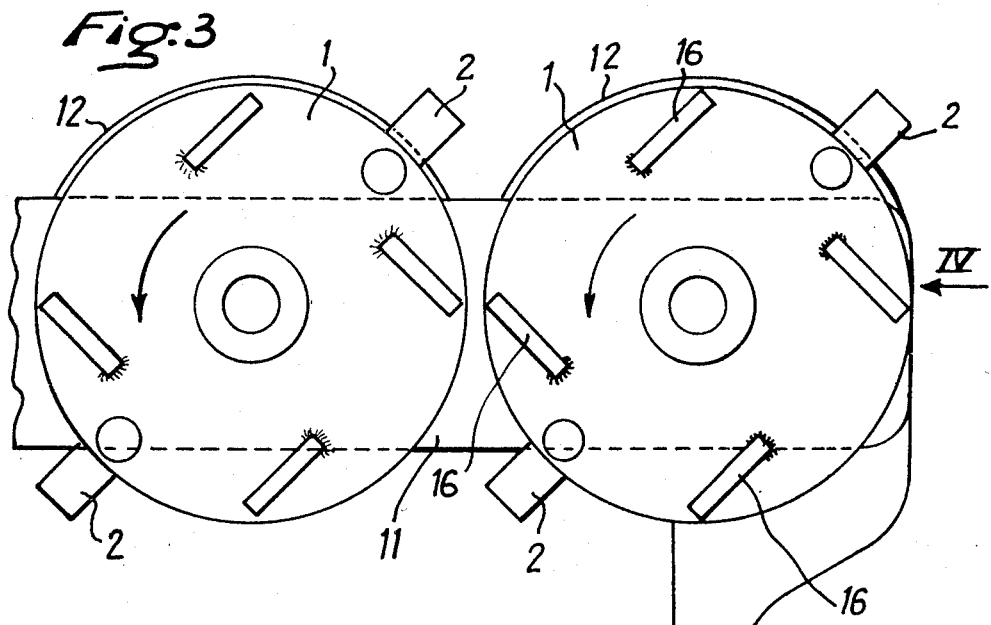
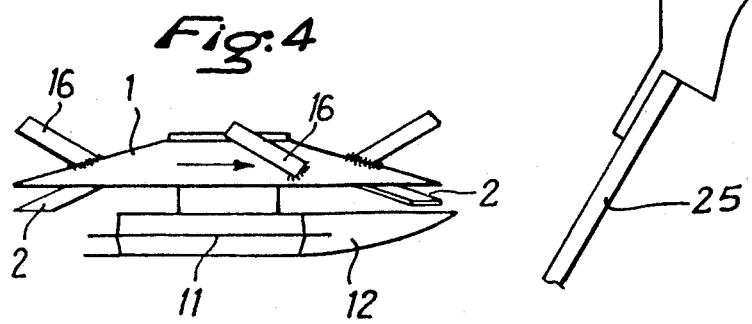

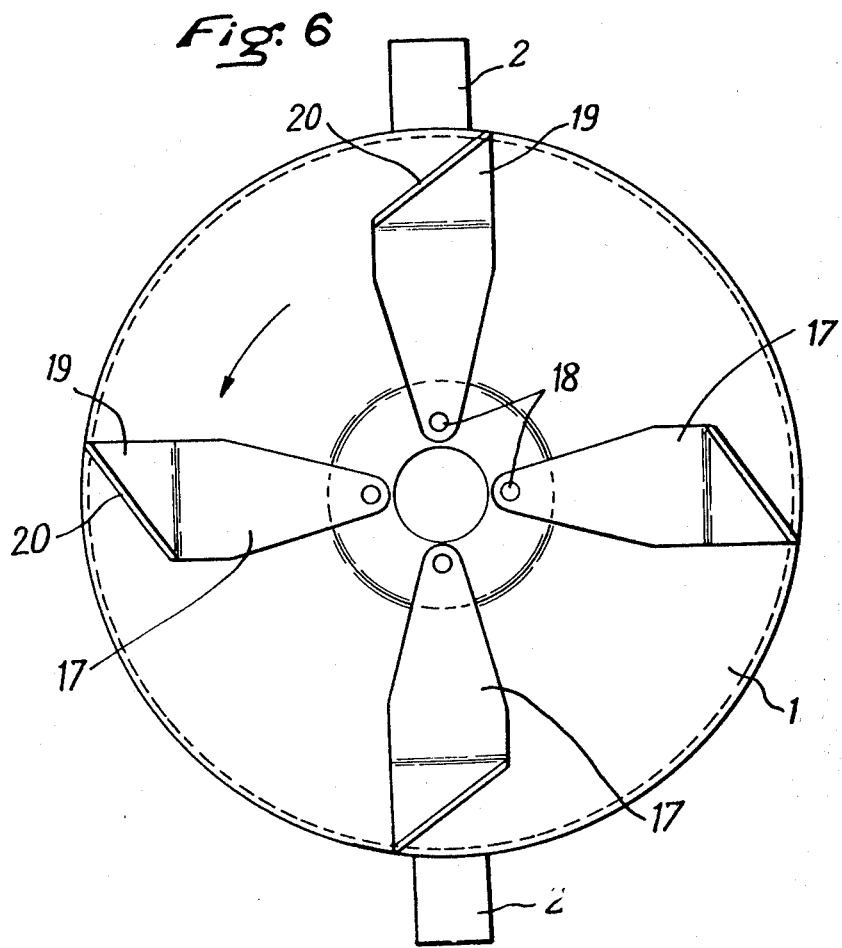
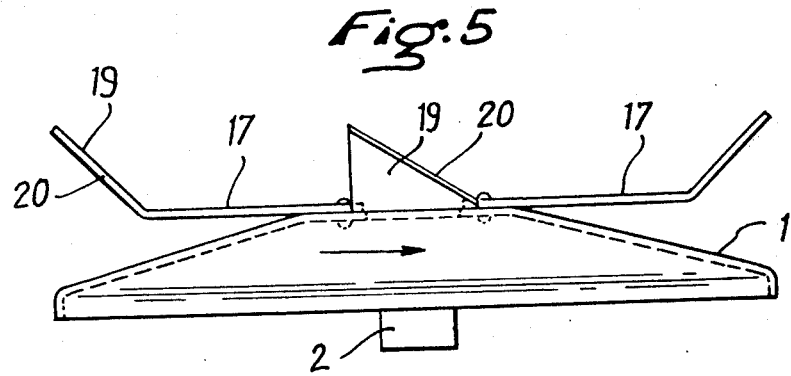

ROTARY MOWER

CROSS REFERENCE TO RELATED APPLICATION

This is a continuation of U.S. patent application Ser. No. 460,666, filed on Apr. 12, 1974, claiming priority of a French Patent application Ser. No. 73.17127, filed on May 11, 1973, in the name of International Harvester France.

BACKGROUND OF THE INVENTION

This invention relates to rotary mowers. Mowers of this type comprise cutting-discs which are aligned transversely to the direction of forward motion and carry knives mounted at their periphery. Beneath the cuttingdiscs are provided frame elements whose intended function is to protect the discs against projections of stones and against clogging. Means are also provided for facilitating the rearward discharge of cut products.

The discharge means are provided at the free end of the mower on the end cutting-disc. It has been proposed to design these means in the form of a drum of conical shape with or without fins. This drum suffers from the disadvantage of substantial weight and bulk and from a further disadvantage in that it produces a fanning action which has a tendency to lay the standing crops in front of the mower, thus resulting in abnormally high land irregular cutting.

The primary aim of the invention is to remove this disadvantage by providing discharge means which are of light weight and practically do not give rise to any fanning or blowing action.

DESCRIPTION OF THE PRIOR ART

A number of solutions have been proposed for preventing interference of the cutting knives with an adjacent cutting-disc. The cutting-discs have been given an oval or elliptical shape which is displaced by 90° from one disc to the next. This arrangement is attended by the disadvantage that the cutting-discs have a low degree of rigidity and it is necessary to provide them with strengthening ribs, thereby increasing the cost price. There have also been formed on the cutting-discs upwardly-stamped zones constituting housings into which pass the knives of adjacent discs. The result of an arrangement of this type is that the projecting portions thus formed produce a harmful fanning effect on the crops which are consequently laid in front of the mower. Another expedient has consisted in forming slits in the cutting-discs so that the knives of adjacent discs may pass freely through said slits. With this particular arrangement, the discs which have thus been cut-out are liable to subject the driving mechanism to fairly violent shocks and even to jam the mower when a stone is thrown up between two discs which are rotating in convergence.

SUMMARY OF THE INVENTION

In accordance with one characteristic feature of the invention, at least the outermost cutting-disc is provided on the top surface thereof with discharge members in which the leading edge begins at said top surface and extends above said surface away from the axis of the cutting-disc and towards the rear with respect to the direction of rotation of this latter. These ejecting members are constituted for example by inclined pins or blades.

In accordance with another characteristic feature of the invention, the two end cutting-discs which are located at the free end of the mower are adapted to rotate in the same direction and each carry discharge means as specified in the foregoing.

In accordance with yet another characteristic feature of the invention, each knife is mounted on its circular disc through a fastening system which comprises a pivot, means for spacing with respect to the bottom surface of the disc, locking means and elastic means so arranged that the knife is permitted to swing about an axis which is inclined to the axis of the pivot under the action of an impact or a high resistance, the arrangement being such that the knife passes beneath the adjacent cutting-discs even if said knife is deformed as a result of impact.

In accordance with still another characteristic feature of the invention, the cutting-disc is provided in the zone of each knife with a vertical skirt which extends downwards substantially to the level of the knives in order to prevent the cut products from being carried away and accumulating beneath the cutting-disc.

In accordance with a further characteristic feature of the invention, frame elements which are placed in front of the frame and extend beneath the front portions of the cutting-discs so as to follow the contours of said discs are mounted on the frame in such a manner as to permit adjustment in the forward and rearward direction in order that said knives may be permitted, according to their length and degree of wear, to project beyond said elements by a predetermined and variable distance which ensures maximum cutting efficiency.

BRIEF DESCRIPTION OF THE DRAWING

In order that the invention may be readily understood and put into practical effect, reference will now be made to the various figures of the drawing in which:

FIG. 1 is a plan view of a rotary mower in accordance with the invention;

FIG. 2 is a view in elevation showing the mower of FIG. 1;

FIG. 3 is a plan view to a larger scale showing the free end of the mower of FIGS. 1 and 2;

FIG. 4 is a side view taken in the direction of the arrow IV of the mower which is shown in FIG. 3;

FIG. 5 is a side view of the end cutting-disc fitted with discharge members in accordance with an alternative form of construction;

FIG. 6 is a plan view of the cutting-disc of FIG. 5;

FIG. 12 shows the front portion of a cutting-disc and of the adjustable frame elements.

DESCRIPTION OF THE PREFERRED EMBODIMENT

Figure 8:
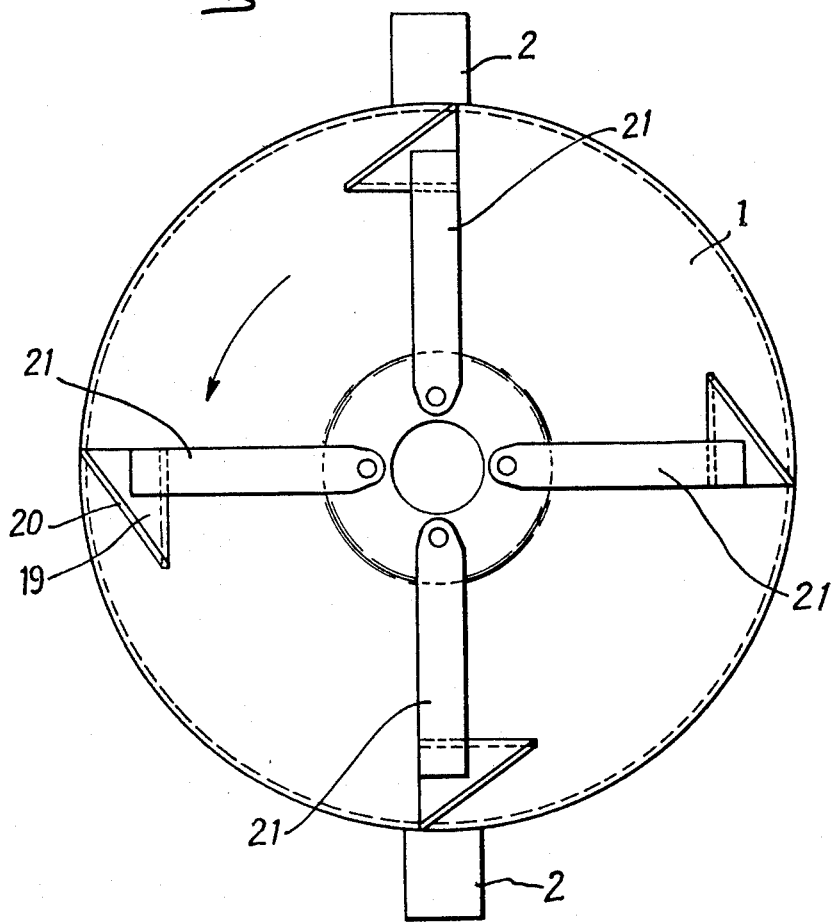
FIGS. 7 and 8 are views which are similar to FIGS. 5 and 6 and relate to an alternative form of construction.

Further properties and advantages of the invention will be apparent hereinafter from a reading of the following description and appended claims, with reference to the figures of the drawing.

The mower which is shown in FIGS. 1 and 2 comprises in known manner a casing 11 of substantial length which supports cutting-discs 1. The cutting-discs are driven in rotation from a control box 22 which transmits its motion to the discs 1 by means of a gear-train housed within the casing 11. Said gear-train comprises coupling wheels 23 and wheels 24 which are keyed on the cutting-disc shafts.

Provision is made between two successive cutting-discs 1 for two gear-wheels 23 in order that adjacent discs should rotate in opposite directions. However, provision is made for three gear-wheels 23 between the last two cutting-discs, that is to say between the discs located at the free end of the mower, in order to ensure that these two discs rotate in the same direction.

The mower has an odd number of cutting-discs such as five discs as shown by way of example in FIG. 1. The first disc rotates in the clockwise direction whilst the last two discs rotate in a counterclockwise direction. Thus the crops which are brought in by the outermost disc are transferred to the penultimate disc and this latter amplifies the movement which has thus been started. Guiding of the crops by the swathboard 25 is accordingly facilitated and any clogging at this point is prevented. Moreover, the separation of the windrows is improved and the clearance above ground over a greater width facilitates turning of the tractor and mower for the following run. The cutting-discs 1 each carry two diametrically opposite knives 2, and the knives of two adjacent discs being relatively displaced by 90°.

In the embodiment shown in FIGS. 3 and 4, the means for facilitating the rearward discharge of cut products are mounted on the outermost cutting-disc and if necessary also on the penultimate disc. Said means comprise inclined pins 16. The pins 16 may be four in number, for example, and are attached to the top surface of the cutting-disc by welding, for example. The projecting ends extend above said surface and obliquely away from the axis of the cutting-disc towards the periphery of the disc. In other words, the ends project upwardly and rearwardly with respect to the direction of rotation of the disc as shown by the arrow. The cut products are thus discharged to the rear without calling for bulky means or producing any harmful fanning action.

In the embodiment shown in FIGS. 5 and 6, only the end cutting-disc 1 is shown. The discharge members comprise plates 17 which may also be four in number, for example. The plates 17 are pivotally mounted on the cutting-disc at 18 in the vicinity of the axis. The free ends of the plates are folded on four oblique planes converging downwardly toward the axis. The folded end portion 19 of each plate 17 constitutes a discharge blade which is cut diagonally so as to ensure that the leading edge 20 is directed upwardly and rearwardly from the top surface with respect to the direction of rotation of the disc and projects obliquely away from the axis of the cutting-disc. The blades are maintained in the outwardly, radially extended positions under centrifugal action but are capable of withdrawing in the event of impact or overload.

Figure 7:
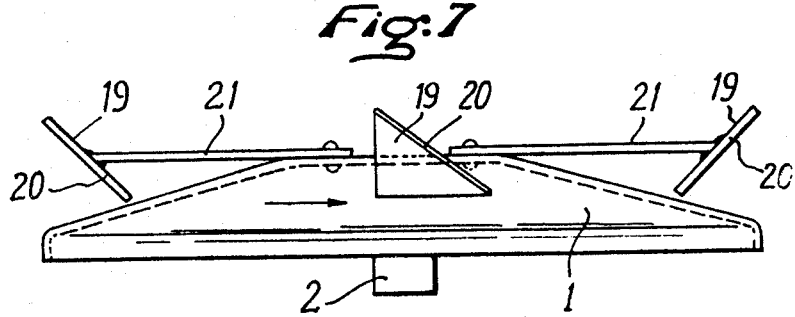

In the embodiment of FIGS. 7 and 8 the same reference numerals as in FIGS. 5 and 6 have been adapted. The folded end portions 19 of FIG. 5 correspond to the triangular blades 19 of FIG. 7 which are shown welded to arms 21. The arms 21 are pivotally mounted on the cutting-disc 1 similar to arms 17 at 18. The blades 19 extend downwards and forwardly to the vicinity of the top surface of the cutting-disc 1 with respect to the direction of rotation of the disc.

By making use of discharge members in accordance with any one of the embodiments shown in FIGS. 3 to 8, the cut crops are efficiently separated from the standing crops. The cut crops are discharged uniformly along the swathboard and towards the rear. These means produce a sufficient mechanical action in the case of lodged and tangled crops in which cut crops still remain intimately mixed with the standing crops without giving rise to the well-known phenomenon of re-cutting which results in an increase in absorbed power and relatively substantial losses on the ground. Furthermore, the means aforesaid produce practically no fanning or blowing action, this being especially important in the case of light crops.

The mode of assembly of the knives will now be described with reference to FIGS. 9 and 10. The means for assembling the knives 2 are so arranged that the knives are capable of vertical displacement under the action of an impact or a substantial resistance. In the embodiment shown in FIG. 9, each knife has a bore 3 through which a ring 4 passes freely. The ring is provided with a bottom annular flange 5. A bolt connects the ring to the underside of the cutting-disc 1. On the other side of the annular flange 5 with respect to the knife, provision is made for an elastic packing 7 which produces action between the cutting-disc 1 and the knife 2 and maintains the knife against the annular flange. In the example shown in FIG. 9, the packing 7 comprises a rubber washer.

During operation, the knife is maintained in the outwardly extended position under centrifugal action. When the knife meets an obstacle which sets up a horizontal resistance, the knife pivots around the longitudinal axis of the bolt 6. When the knife encounters an obstacle which sets up a vertical resistance in the direction P or P' or having a vertical component, the knife rocks or swings along the longitudinal axis and the inclined surface of the knife compresses the washer 7 on one or the other diametrical side as shown in the two dot-dash line displaced positions of the knife. The knife thus yields in contact with the obstacle, thereby preventing any damage to the knife and increasing the safety of this latter. Said knife subsequently returns to the normal position as a result of the restoring action of the washer 7.

Figure 9:
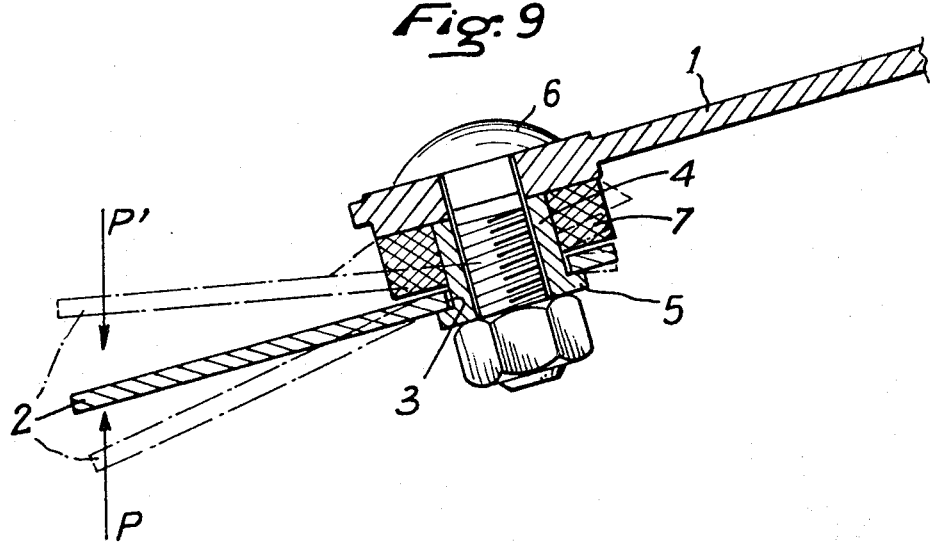
FIG. 9 is a sectional view showing a part of the cutting-disc and a knife which is mounted on said disc.
Figure 10:
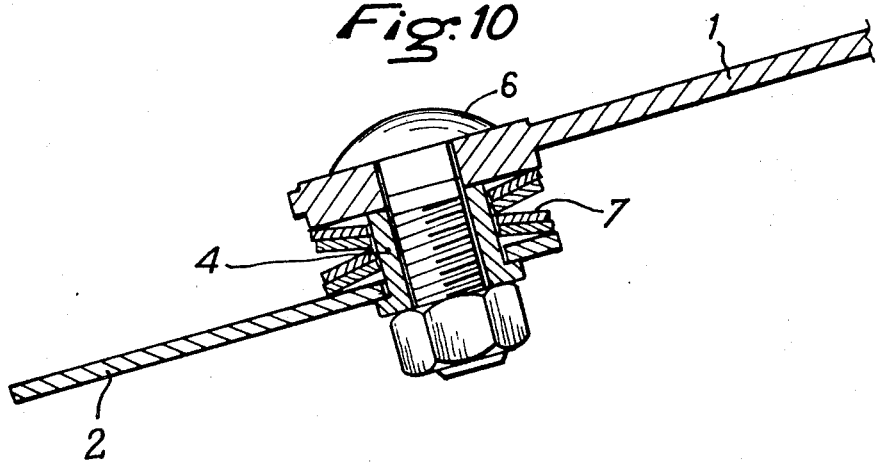
FIG. 10 is a view which is similar to FIG. 9 and relates to an alternative form of construction.

In the embodiment shown in FIG. 10, the packing 7 comprises a metallic washer of the Belleville type which produces action in much the same manner as the rubber washer of FIG. 9.

Figure 11:
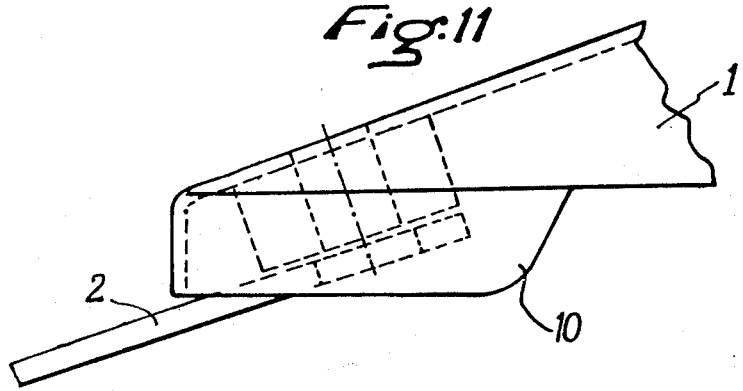
FIG. 11 shows a protective skirt for the knives of FIGS. 9 and 10.

In FIG. 11 there is shown a cutting-disc 1 and a knife 2 which is mounted in accordance with FIGS. 9 or 10 with a skirt around the mounting. A substantially vertical and downwardly extending skirt 10 is provided at the periphery of the cutting-disc 1 in the zone of the knives in order to prevent displacement and accumulation of the cut products.

In FIG. 12, which appears on the sheet with FIGS. 3 and 4 there is shown a particular arrangement for the protection of the knives and the cutting-discs. The stationary frame 11 supports the cutting-discs 1, only one disc being shown in the figure. The discs are fitted with knives 2 in the usual manner. Beneath the cutting-discs 1, the casing 11 is adapted to carry protective shoes 12 which project in the forward direction and slightly beyond the cutting-discs while following the contours of these latter. Each protective shoe 12 is mounted on the frame by means of a plate 13 which is rigidly fixed to said frame by means of a bolt 14 which is inserted in an elongated slot 15 formed in said shoe. Thus, depending on the length of the knives employed or the degree of wear of these latter, the shoes can be adjusted either in the forward or the rearward direction so as to ensure that the knives project beyond the shoes by the distance which ensures optimum cutting efficiency.

What is claimed is:

1. In a rotary mower of the type having a plurality of side-by-side cutter discs rotatably mounted on shafts supported on an elongated beam structure, the beam structure having an inboard and an outboard end extending transversely with respect to the direction of travel, the cutter discs having upper and lower sides, the lower sides carrying at least two diametrically aligned cutting blades, the outboard of the beam structure carrying at least two cutter discs which are adapted to rotate in the same direction, and a conveyor means on at least the outermost disc of the two cutter discs for conveying cut crop rearwardly and towards the inboard side of the beam structure, wherein the improvement comprises:

four paddles carried on the upper side of the outermost disc of the two cutter discs, the paddles are arranged quadrantally on the outermost cutter disc, and each paddle having a broadside lying on one respective plane of four planes defining an inverted right square prism where the apex lies on the extended axis of the outermost cutter disc below the lower side, each paddle further having a leading edge with respect to the direction of rotation of the outermost cutter disc ascending along the respective plane rearwardly to a point above the periphery of the outermost cutter disc.

2. The invention as claimed in claim 1, wherein, the paddles comprise elongated bars, each bar having an end mounted to the upper side of the outermost cutter disc and a flat body portion forming the broadside lying on the respective plane and a long side forming the leading edge.

3. The invention as claimed in claim 1, further including four radially extending arms quadrantally mounted at one end to the upper side of the outermost cutter disc with the opposite ends of the arms supporting the paddles.

4. The invention as claimed in claim 3, wherein, the paddles comprise right triangular shaped plates, each plate having a flat body portion forming the broadside lying on the respective plane and having one leg extending parallel to a horizontal plane defining the base of the right square prism and having the hypotenuse side forming the leading edge.

5. The invention as claimed in claim 4, wherein, the paddles are mounted ot the opposite ends of the arms along the one leg.

6. The invention as claimed in claim 4, wherein, the paddles are mounted to the opposite ends of the arms along the body portion between the span of the second leg of each triangular shaped plate.

7. The invention as claimed in claim 1, further including two diametrically aligned depending skirt means mounted to the lower side of the outermost cutter disc for sweeping cut crop out from beneath the lower side and the beam structure.

8. The invention as claimed in claim 7, wherein, the cutting blades are mounted in trailing relationship behind the skirt means with respect to the direction of rotation of the outermost cutter disc.

9. The invention as claimed in claim 1, further including a shoe means projecting in the forwardly direction of travel of the mower and being mounted to the outboard end of the beam for riding the beam over ground obstructions.

10. The invention as claimed in claim 9, wherein, the shoe means is adjustable in the forwardly direction of travel for positioning the shoe means a predetermined distance rearwardly of the cutting blades.

11. The invention as claimed in claim 1, wherein, the penultimate disc is also provided with four paddles.

12. The invention as claimed in claim 11, wherein, the paddles comprise elongated bars, each bar having an end mounted to the upper side of the respective cutter disc and a flat body portion forming the broadside lying on the respective plane and a long side forming the leading edge.

13. The invention as claimed in claim 11, further including four radially extending arms quadrantally mounted at one end to the upper side of each of the two cutter discs with the opposite ends of the arms supporting the paddles.

14. The invention as claimed in claim 13, wherein, the paddles comprise right triangular shaped plates, each plate having a flat body portion forming the broadside lying on the respective plane and having one leg extending parallel to a horizontal plane defining the base of the right square prism and having the hypotenuse side forming the leading edge.

15. The invention as claimed in claim 14, wherein, the paddles are mounted ot the opposite ends of the arms along the one leg.

16. The invention as claimed in claim 14, wherein, the paddles are mounted to the opposite ends of the arms along the body portion between the span of the second leg of each triangular shaped plate.

17. The invention as claimed in claim 11, further including two diametrically aligned depending skirt means mounted to the lower side of the two cutter discs for sweeping cut crop out from between the lower side and the beam structure.

18. The invention as claimed in claim 17, wherein, the cutting blades are mounted in trailing relationship behind the skirt means with respect to the direction of rotation of the two cutter discs.

19. The invention as claimed in claim 11, further including a shoe means projecting in the forwardly direction of travel of the mower and being mounted to the outboard end of the beam for riding the beam over ground obstructions.

20. The invention as claimed in claim 19, wherein, the shoe means is adjustable in the forwardly direction of travel for positioning the show means a predetermined distance rearwardly of the cutting blades.

* * * * *